United States Patent [19]

Calicchio et al.

[11] Patent Number: 5,246,681
[45] Date of Patent: Sep. 21, 1993

[54] PROCESS FOR THE REMOVAL OF CADMIUM FROM SOLUTIONS OF PHOSPHORIC ACID

[75] Inventors: Gaetano Calicchio, Cremona; Fabio Bassan, Padua; Norma M. Ito, Venice, all of Italy

[73] Assignee: Enichem Agricoltura S.p.A., Palermo, Italy

[21] Appl. No.: 877,866

[22] Filed: May 4, 1992

[30] Foreign Application Priority Data

Oct. 11, 1991 [IT] Italy .................. MI91A002704

[51] Int. Cl.$^5$ .................. C01B 25/16; B03G 1/00
[52] U.S. Cl. .................. 423/321 · 423/100
[58] Field of Search .................. 423/321 R, 100

[56] References Cited

U.S. PATENT DOCUMENTS

| | | | |
|---|---|---|---|
| 3,306,702 | 2/1967 | Odland et al. | 423/321 R |
| 4,238,294 | 12/1980 | Takeuchi et al. | 423/100 |
| 4,511,541 | 4/1985 | Bierman et al. | 423/100 |
| 4,806,323 | 2/1989 | Tjioe et al. | 423/100 |
| 4,877,594 | 10/1989 | Bierman et al. | 423/321 R |

Primary Examiner—Gregory A. Heller
Attorney, Agent, or Firm—Shea & Gould

[57] ABSTRACT

Process for the removal of cadmium from solutions of phosphoric acid derived by the sulphuric and nitric digestion of phosphatic rocks, including the following steps:

adding to the phosphoric acid solution bromide ions, such as hydrogen bromide or the bromides of alkaline metals, in quantities ranging from 100 to 3500 ppm;

adding to the same solution of at least one condensed polyphosphatic compound in a concentration of 1 to 5% by weight;

eluting the mixture thus obtained through at least two beds of an ion-exchange resin with a styrene divinylbenzene matrix at a temperature ranging from 15° to 50° C.

5 Claims, No Drawings

PROCESS FOR THE REMOVAL OF CADMIUM FROM SOLUTIONS OF PHOSPHORIC ACID

DESCRIPTION

The present invention relates to a process for the removal of cadmium from currents of phosphoric acid derived from the sulphuric and nitric digestion of phosphatic rocks, which process consists of eluating the phosphoric acid, to which hydrogen or bromide alkaline metal bromides and condensed polyphosphatic compounds have been added, on at least two beds of ion-exchange resin.

It is well-known that cadmium is contained in phosphorites in quantities varying from 2 to 100 ppm depending on the place of origin of the phosphatic rocks. Most of this cadmium passes into the phosphoric solution during the process for the production of phosphoric acid, whereas a small amount remains in the chalk to be disposed of and is consequently extracted from the final products.

The cadmium present in phosphoric acid is found in fertilizers, in a type soluble in water, and in quantities strictly related to the percentage of $P_2O_5$ present in various formulations.

The sometimes massive use of phosphate fertilizers in agriculture can lead to a considerable accumulation of the above mentioned metal in the soil and, through plants which are responsible for its insertion in the food chain, to a consequent accumulation in the liver and kidneys, causing an understandably great risk to human health.

Many methods have been proposed for reducing the amount of cadmium, based, for example, on a pretreatment of the starting phosphatic rocks or on complicated methods of predigestion of the rocks. Most of these methods, however, are orientated towards treatment of the phosphoric solutions.

Almost all of these processes for purifying phosphoric solutions of the cadmium contained in them use the technique of liquid-liquid extraction with selective organic reagents such as amines having a high molecular weight, sulphides or thiophosphoric esters.

These techniques, which generally recover the cadmium from the acid at 28-30% of $P_2O_5$, entail considerable operating difficulties not only due to the small quantities of cadmium to be extracted with respect to the volumes of acid involved, but also because of the complexity of the acid mixture to be treated, due to the presence of organic substances, suspended solids and metallic impurities which compete with the cadmium in the extraction operations. In addition, these methods cannot always be applied to higher concentrations (40-60% of $P_2O_5$) such as those which are normally used by the fertilizer industry.

It is also known that cadmium can be extracted from relatively concentrated solutions of phosphoric acid by the addition of halide ions and the use of ion-exchange resins as an extraction medium. See, for example, German Patent Application 3.327.394, Japanese Patent Application 88035645 and European Patent Application 244.021.

The latter, in particular, describes the use of an anionic resin through which the phosphoric acid polluted by the presence of cadmium is passed, to which a halide ion is added in quantities ranging from 100-6000 ppm. The operation is carried out in the presence of a gaseous flow of nitrogen or of a metal which ensures a reducing environment.

The process is carried out in a single stage and can also include the removal of excess halide ions by using a resin which is similar to that used for the removal of the cadmium. The resin thus charged may in its turn be used for removing the cadmium from other phosphoric solutions.

However, the use of halide ions alone, which seems to have the function of forming complex ions $[CdX_4]=$ with a high affinity for the resin, causes a rapid saturation of the active centers of the resin because of the metals competing with the cadmium and a certain difficulty in regenerating this resin once exhausted, because of the difficulties in stripping the cadmium using eluant solutions normally used in these cases.

The Applicant has now found that it is possible to carry out the removal of cadmium from solutions of phosphoric acid obtained by treatment of phosphatic rocks by eluting these solutions through ion-exchange resins, without any of the previous operating drawbacks and obtaining, in the end, an exhausted resin which can be easily regenerated using the conventional methods.

The present invention therefore relates to a process for purifying phosphoric acid obtained from phosphatic rocks of cadmium, which includes an elution of the phosphoric acid thus obtained through at least two ion-exchange resin beds following a preliminary addition of bromide ions, in the form of hydrogen bromide or alkaline metal bromides, and of at least one condensed polyphosphatic compound which is capable of complexing the metals which compete with cadmium, by limiting, to a great extent, their absorption by the resin.

More specifically, the process of the present invention allows the removal of cadmium from solutions of phosphoric acid caused by the sulphuric or nitric digestion of phosphatic rocks. The process includes the preliminary addition of bromide ions and at least one polyphosphatic compound to these solutions and the passage of the solution thus obtained over at least two ion-exchange resin beds with a styrene divinylbenzene matrix.

Compared to the known processes, such as those previously mentioned in the reference in the known art, the process of the present invention also has the following advantages:

cadmium removal is over 90%;

there is no loss of $P_2O_5$;

all the effluents of the process can be recycled to the production plant of phosphoric acid;

the chemicals added are satisfactorily removed;

it is simple process;

it is effective for all concentrations of phosphoric acid;

few reagents are used;

no pretreatment of the acid is required to eliminate the suspended solids;

no reducing substances are required;

it is high selective with respect to the cadmium;

it is a compatible cost for the fertilizing industry.

In detail, the process of the present invention includes the following fundamental steps:

adding to the solution of phosphoric acid obtained from the treatment phosphatic rocks of a quantity of bromide ions ranging from 100 to 3500 ppm, in the form of hydrogen bromide or the alkaline metal bromides;

adding to the same solution at least one condensed polyphosphatic compound in a concentration of 1 to 5% by weight; and eluting the mixture thus obtained through at least two ion-exchange resin beds with a styrene divinylbenzene matrix at a temperature ranging from 15° to 50° C.

The condensed polyphosphatic compound is selected from the derivative known as 10.34.0, sodium hexamethaphosphate and superphosphoric acid.

For the specific use of two resin beds, the first bed is preferably composed of mixed resin containing more than 30%, in volume, of a chelant-type resin called "CHELEX 20" (produced by Dow Chemical) with a styrene divinylbenzene matrix with functional iminediacetic groups, and the rest composed of a weak anionic resin (such as AMBERLITE IRA-93, produced by "Rohm and Haas") with a styrene divinylbenzene matrix with functional groups composed of tertiary amines.

Both resins contain high percentages of divinylbenzene and this gives better physical and chemical resistance requiring a limited annual make-up even though the operating conditions are particulary rigid.

The second bed is composed of a single weak anionic resin (AMBERLITE IRA-93).

Operating with the bed of mixed resin allows the removal from the solution of the cadmium and recovery of part of the bromide.

It is convenient to use, however, in series with the first, a second bed of a weak anionic resin, only, to obtain the maximum recovery of the bromide and to recycle at least 85% of the chemical.

The addition of a polyphosphate to the phosphoric acid increases the absorption capacity of the "CHELEX 20" for the cadmium and decreases the content of polluting metallic substances in the regeneration fluids allowing the recovery of the cadmium from these solutions to be in a sufficiently pure saline form.

For the bed of mixed resin, the regeneration step consists of two elution flows: (i) water, for the recovery of the cadmium and bromide which competes with it, and (ii) an ammonial solution having a concentration of 5 to 10% which, apart from supplying the OH ions required for the "CHELEX 20" to operate most effectively, also allows the recovery of the rest of the bromides.

For the bed of weak anionic resin, the regenerating solution consists of the ammonial solution alone in the same concentration as the previous one.

The cadmium is precipitated from the aqueous regenerating solution of the mixed bed in the form of sulphide by adding $H_2S$ or $(NH_4)_2S$ or $Na_2S$; the sulphides of other metals such as zinc, aluminum, iron and other, precipitate together with the cadmium.

The excess $H_2S$ is recovered from the aqueous solution by stripping with vapor, whereas the liquid containing $P_2O_5$ and bromides is recycled, together with the regenerating ammonial solutions of the two resin beds which also contain $P_2O_5$ and bromides, to the phosphoric acid production plant.

EXAMPLE

The $H_3PO_4$, having a cadmium content of 52 ppm, at 42% $P_2O_5$, to which KBr had been added in such quantities as to obtain a concentration of 800 ppm and 1% of 10.34.0, was eluated, at a temperature of 50°C. and at a spacial rate of 5 BV/h, on a bed of mixed resin composed of 30 volume % of CHELEX 20 and 70 volume % of AMBERLITE IRA-93.

At the outlet, the acid contained 5 ppm of cadmium and 348 ppm of bromide after an elution equal to 20 BV.

It was subsequently eluated on a column of weak anionic resin at the same rate, temperature and quantity obtaining an acid having a cadmium content of 2 ppm and a bromide content of 80 ppm.

After this operation the regeneration of the two resin beds was initiated.

For the mixed resin elution was first carried out with 5 BV of $H_2O$ at room temperature and at a rate of 2.5 BV/h, obtaining a solution containing 14% of $P_2O_5$, 300 ppm of Cd and 190 ppm of bromide. This solution was brought to pH 0.3 with gaseous $NH_3$ and subsequently the Cd was precipitated and separated as CdS by adding $Na_2S$.

The residuous solution was recycled to phosphoric acid production plant which was together with the subsequent washing of the column which was carried out with 3 BV of a 10% $NH_3$ basic solution to recover all the fixed bromide. This solution contained, at the outlet of the column, 2200 ppm of bromide and less than 5 ppm of cadmium.

For the weak anionic resin elution was carried out with 3 BV of a 10% solution of $NH_3$, at room temperature and at a spacial rate of 2.5 BV/h.

At the outlet, a solution containing 14% of $P_2O_5$, 2200 ppm of bromide and 10 ppm of cadmium wa obtained.

This solution was also recycled to the phosphoric acid production plant.

We claim:

1. A process for the removal of cadmium from phosphoric acid solutions resulting from digesting phosphatic rocks with sulfuric and nitric, which comprises the steps of:
   (a) adding to the phosphoric acid solution bromide ions in quantities ranging from 100 to 3500 ppm;
   (b) adding to the same solution at least one condensed polyphosphatic compound in a concentration of 1 to 5% by weight;
   (c) then eluting the mixture thus obtained through at least two ion-exchange resin beds with a styrene divinylbenzene matrix at a temperature ranging from 15° to 50°C.; and
   (d) recovering the phosphoric acid.

2. The process of claim 1, wherein the condensed polyphosphatic compound is the derivative known as 10.34.0 sodium hexametaphosphate and superphosphoric acid.

3. The process of claim 1, wherein the bromide ions are obtained from an alkaline metal bromide.

4. The process of claim 3, wherein the alkaline metal bromide is potassium bromide.

5. The process of claim 1, wherein the bromide ions are obtained from hydrogen bromide.

* * * * *